(12) United States Patent
Ko

(10) Patent No.: US 9,650,068 B1
(45) Date of Patent: May 16, 2017

(54) ELECTRONIC CONTROL UNIT AND METHOD FOR COMPENSATING FOR TORQUE STEER

(71) Applicant: MANDO CORPORATION, Gyeonggi-do (KR)

(72) Inventor: Sang Jin Ko, Daejeon (KR)

(73) Assignee: MANDO CORPORATION, Gyeonggi-Do (KR)

(*) Notice: Subject to any disclaimer, the term of this patent is extended or adjusted under 35 U.S.C. 154(b) by 24 days.

(21) Appl. No.: 14/924,685

(22) Filed: Oct. 27, 2015

(51) Int. Cl.
*B62D 6/04* (2006.01)
*B62D 5/04* (2006.01)
*B62D 6/00* (2006.01)
*B62D 7/15* (2006.01)

(52) U.S. Cl.
CPC .............. *B62D 6/04* (2013.01); *B62D 5/0463* (2013.01); *B62D 5/0475* (2013.01); *B62D 6/003* (2013.01); *B62D 7/159* (2013.01)

(58) Field of Classification Search
None
See application file for complete search history.

(56) References Cited

U.S. PATENT DOCUMENTS

| | | | |
|---|---|---|---|
| 6,597,975 B1 * | 7/2003 | Shinmura | B62D 5/0472 318/430 |
| 7,106,012 B2 * | 9/2006 | Matsuda | B62D 5/008 180/443 |
| 7,219,761 B2 * | 5/2007 | Fukuda | B62D 5/0427 180/443 |
| 2014/0005894 A1 * | 1/2014 | Aoki | B62D 5/0484 701/43 |
| 2016/0101809 A1 * | 4/2016 | Hong | B62D 5/0484 701/43 |

FOREIGN PATENT DOCUMENTS

| DE | 10 2005 045 243 | 3/2007 |
|---|---|---|
| DE | 10 2010 030 532 | 12/2011 |

OTHER PUBLICATIONS

Office Action dated Aug. 31, 2016 for German Patent Application No. 10 2015 221 711.6 and its English translation by Google Translate.

* cited by examiner

*Primary Examiner* — Russell Frejd
(74) *Attorney, Agent, or Firm* — Ladas & Parry, LLP

(57) ABSTRACT

The present invention relates to an electronic control unit and a method for compensating for a torque steer. The electronic control unit includes: a driving torque calculation unit that calculates a drive shaft driving torque value using engine operation information and transmission operation information; a torque steer degree calculation unit that calculates the actual driving torque value of a vehicle based on the drive shaft driving torque value, and calculates a torque steer degree by using the actual driving torque value; a compensation current calculation unit that calculates a torque steer compensation current value that compensates for the torque steer using the torque steer degree; and a motor driving control unit that calculates a basic control current value using a steering angle and a steering torque value, calculates the final control current value by adding the torque steer compensation current value to the basic control current value, and generates a control current according to the final control current value in order to supply the control current value to an electric motor.

13 Claims, 9 Drawing Sheets

ELECTRONIC CONTROL UNIT AND METHOD FOR COMPENSATING FOR TORQUE STEER

BACKGROUND OF THE INVENTION

1. Field of the Invention

The present invention relates to an electronic control unit and a method for compensating for a torque steer.

2. Description of the Prior Art

In general, the phenomenon in which the body shell of a vehicle is tilted to one side as a result of a difference between the driving forces of the left and right wheels when the vehicle abruptly starts is called a torque steer phenomenon.

The causes of the torque steer include the difference between the lengths of the left and right drive shafts and the difference between the bending angles of the left and right drive shafts.

The method of solving the torque steer includes a method of adding an intermediate shaft to a short drive shaft in order to make the lengths of the drive shafts and bending angles the same and also includes a method of compensating for a torque steer by using a power steering system.

Among them, the conventional method of compensating for a torque steer using a power steering system is to estimate the degree of the torque steer by using an engine RPM, an engine torque, an acceleration pedal manipulation degree, and the speed of the vehicle by an electronic control unit (ECU) of a power steering system and to apply a compensation current to an electric motor that is proportional to the estimated torque steer.

In the above-mentioned conventional method, a torque steer degree is estimated by using indirect information on a torque steer, such as an engine RPM, an engine torque, an acceleration pedal manipulation degree, and the speed of the vehicle, and because direct information on a torque steer, such as the slip degrees of the left and right wheels of the vehicle is not used, a torque steer degree that may vary according to a change in the slip degrees of the wheels of the vehicle cannot be precisely recognized.

Accordingly, if a torque steer is compensated for in an electronic control unit of a power steering system according to the conventional method, the torque steer that occurs cannot actually be appropriately reduced.

SUMMARY OF THE INVENTION

In this background, the present invention provides an electronic control unit and the method of a motor driven power steering system that calculates the actual driving torque value consumed while driving a vehicle in consideration of the slip degrees of the wheels of the vehicle, and generates an auxiliary steering force to compensate for the torque steer.

In accordance with an aspect of the present invention, there is provided an electronic control unit for compensating for a torque steer, the electronic control unit including: a driving torque calculation unit that calculates a drive shaft driving torque value using engine operation information and transmission operation information; a torque steer degree calculation unit that calculates the actual driving torque value of a vehicle based on the drive shaft driving torque value, and calculates a torque steer degree by using the actual driving torque value; a compensation current calculation unit that calculates a torque steer compensation current value that compensates for the torque steer using the torque steer degree; and a motor driving control unit that calculates a basic control current value using a steering angle and a steering torque value, calculates the final control current value by adding the torque steer compensation current value to the basic control current value, and generates a control current according to the final control current value in order to supply the control current value to an electric motor.

In accordance with another aspect of the present invention, there is provided a method for compensating a torque steer in an electronic control unit of a motor driven power steering system, the method including: a drive shaft driving torque calculating step of calculating a drive shaft driving torque value using engine operation information that contains an engine torque value and an engine speed value and transmission operation information containing a torque converter speed value and a gear ratio; a slip determining step of determining whether a slip of a vehicle occurs using behavior information of the vehicle containing one or more of a front wheel rotational speed, a rear wheel rotational speed, and a longitudinal acceleration value; an actual driving torque value calculating step of, if it is determined in the slip determining step that a slip does not occur in the vehicle, setting a slip index to a specific value, and if it is determined in the slip determining step that a slip occurs in the vehicle, calculating the slip index and calculating an actual driving torque value of the vehicle using the drive shaft driving torque value and the slip index; a compensating current calculating step of calculating a torque steer degree using the actual driving torque value, and calculating a torque steer compensation current value for compensating the torque steer using the torque steer degree; and a torque steer compensating step of calculating a final control current value by adding the torque steer compensation current value to a basic control current value that is calculated using a steering angle and a steering torque value, and generating a current value according to the final control current value to supply the control current to an electric motor.

As described above, according to the present invention, because an electronic control unit of a motor driven power steering system calculates the actual driving torque value consumed while driving a vehicle in consideration of the slip degrees of the wheels of a vehicle, and generates a control current to compensate for a torque steer that occurs in the vehicle through the actual driving torque value, a torque steer that may vary according to a change in a slip degree of the vehicle can be appropriately compensated for.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE EXEMPLARY EMBODIMENTS

Hereinafter, exemplary embodiments of the present invention will be described in detail with reference to the exemplary drawings. In the description of the elements of the present invention, terms "first", "second", "A", "B", "(a)", "(b)" and the like may be used. These terms are merely used to distinguish one structural element from other structural elements, and a property, an order, a sequence and the like of a corresponding structural element are not limited by the term. It should be noted that if it is described in the specification that one component is "connected," "coupled" or "joined" to another component, a third component may be "connected," "coupled," and "joined" between the first and second components, although the first component may be directly connected, coupled or joined to the second component.

Figure 1:
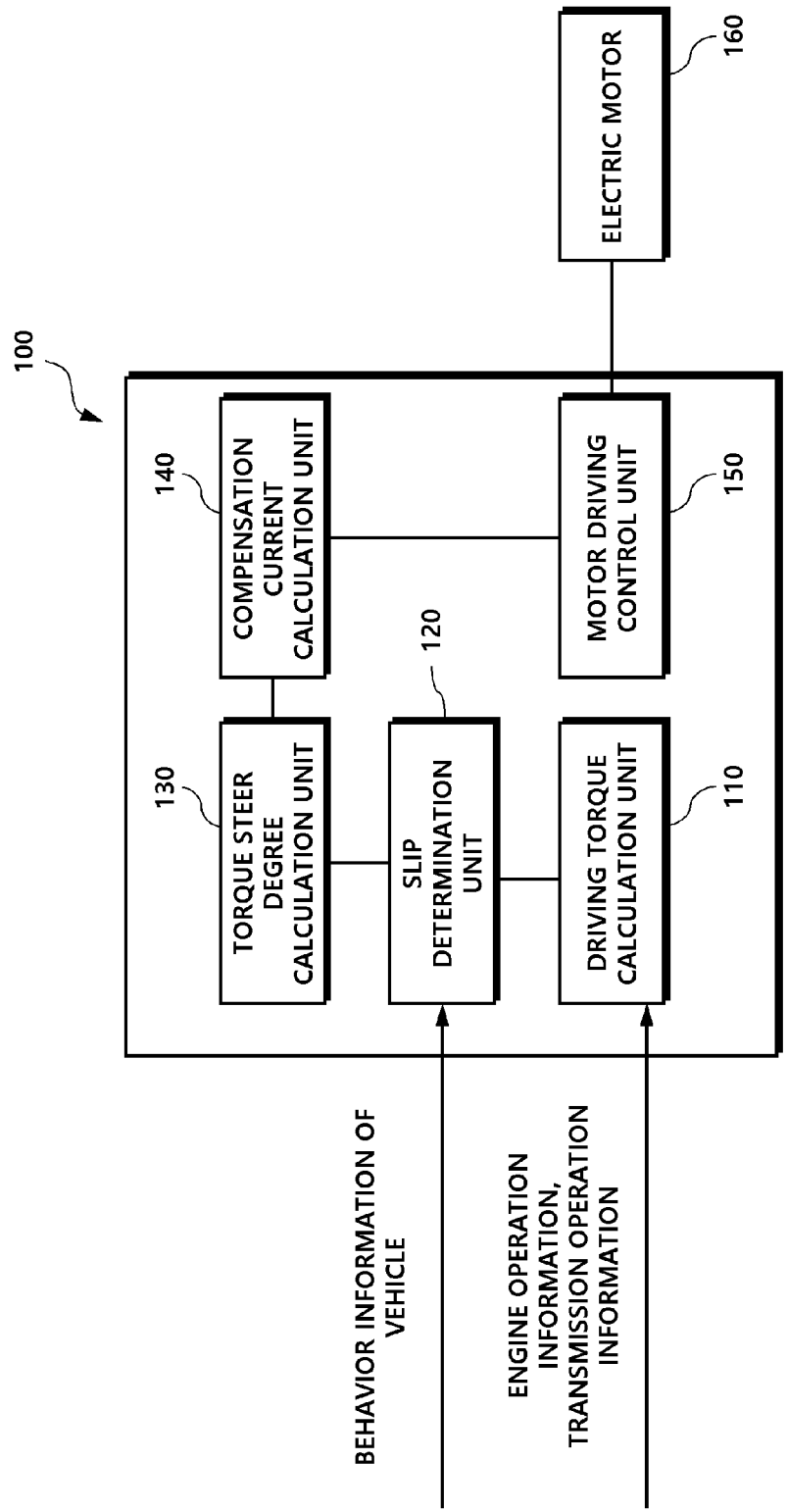
FIG. 1 is a block diagram schematically illustrating a configuration of an electronic control unit according to an embodiment of the present invention.

FIG. 1 is a block diagram schematically illustrating a configuration of an electronic control unit according to an embodiment of the present invention.

An electronic control unit 100, according to an embodiment of the present invention, which is an electronic control unit 100 of a motor driven power steering system mounted on a vehicle, includes a driving torque calculation unit 110, a slip determination unit 120, a torque steer degree calculation unit 130, a compensation current calculation unit 140, and a motor driving control unit 150.

The driving torque calculation unit 110 calculates a drive shaft driving torque value by using engine operation information and transmission operation information. Here, the engine operation information contains the engine torque value and the engine speed value that are received from the engine module (not illustrated), and the transmission operation information contains a torque converter speed value and a gear ratio that are received from a transmission module (not illustrated).

The driving torque calculation unit 110 calculates a speed ratio by dividing the torque converter speed value by the engine speed value as represented in Equation 1, extracts a torque converter efficiency according to the speed ratio in a torque converter efficiency map stored in advance, and extracts a torque converter output torque ratio according to the speed ratio in an output torque ratio map stored in advance.

$$\text{Speed ratio} = \frac{\text{Torque converter speed value}}{\text{Engine speed value}} \quad \text{Equation 1}$$

Thereafter, the driving torque calculation unit 110 calculates a torque converter output torque value by multiplying all of the torque converter efficiency, the torque converter output torque ratio, and the engine torque value as represented in Equation 2.

Torque converter output torque value=Torque converter efficiency×Torque converter output torque ratio×Engine torque value    Equation 2

The driving torque calculation unit 110 calculates a transmission output torque value by multiplying the torque converter output torque value and the gear ratio as represented in Equation 3, and calculates a drive shaft driving torque value by multiplying the gear ratio of a final reduction gear and a transmission output torque value as represented in Equation 4. Here, the drive shaft driving torque value refers to a torque value that is transmitted from an operated engine to a drive shaft.

Transmission output torque value=Torque converter output torque value×Gear ratio    Equation 3

Drive shaft driving torque value=Longitudinal gear ratio×Transmission output torque value    Equation 4

Meanwhile, the electronic control unit 100, according to the embodiment of the present invention, may include a slip determination unit 120 if necessary. For example, the slip determination unit 120 determines whether a slip of the vehicle occurs by using behavior information of the vehicle. Here, the slip determination unit 120 may set a slip index that corresponds to a slide index of wheels of the vehicle to a specific value when determining that a slip does not occur in the vehicle.

For example, the torque steer degree calculation unit 130 may calculate a torque steer degree by using the drive shaft driving torque value. When the slip determination unit 120 is omitted, the torque steer degree calculation unit 130 may calculate the torque steer degree by using the above-described specific value and the drive shaft driving torque value.

As another example, it is necessary to determine whether a slip of the vehicle occurs and to calculate a torque steer degree by using another slip index according to a slip angle in order to calculate a more precise torque steer degree. Accordingly, the electronic control unit 100 of the present invention may further include a slip determination unit 120, and the slip determination unit 120 may determine whether a slip of the vehicle occurs as well as the slip angle. Accordingly, if it is determined that a slip occurs in the vehicle, the torque steer degree calculation unit 130 may additionally calculate a slip index and calculate a more precise torque steer degree.

According to the present invention, if an electronic stability control unit is not mounted on the vehicle, the slip determination unit 120 uses a front wheel rotational speed and a rear wheel rotational speed that are received from a speed sensor (not illustrated) as behavior information of the vehicle, and if an electronic stability control unit is mounted on the vehicle, the slip determination unit 120 may use a longitudinal acceleration value of the vehicle that is received from a longitudinal acceleration sensor (not illustrated) as behavior information of the vehicle. Here, the front wheel rotational speed is an average value of the rotational speeds of the left and right front wheels, and the rear wheel rotational speed is an average value of the rotational speeds of the left and right rear wheels.

When the slip determination unit 120 uses the front wheel rotational speed and the rear wheel rotational speed as behavior information of the vehicle, the slip determination unit 120 compares the absolute value of a value that is obtained by subtracting the front wheel rotational speed from the rear wheel rotational speed with a first reference value as represented in Equation 5.

|Rear wheel rotational speed—Front wheel rotational speed|≤First reference value    Equation 5

If the absolute value of Equation 5 is smaller than or equal to the first reference value, it is determined that a slip does not occur in the vehicle, and if the absolute value of Equation 5 is larger than the first reference value, it is determined that a slip occurs in the vehicle. That is, if the absolute value of Equation 5 is larger than the first reference value, it means that a severe slip of the front wheels occurs, and if the absolute value of Equation 5 is smaller than or equal to the first reference value, it means that an extremely slight slip of the front wheels occurs or does not occur.

Meanwhile, when the behavior information of the vehicle is used as the longitudinal acceleration value of the vehicle, the slip determination unit 120 extracts a general longitudinal acceleration value according the drive shaft driving torque value from a longitudinal acceleration map stored in advance, and compares the absolute value of a value that is obtained by subtracting the general longitudinal acceleration value from the longitudinal acceleration value with the second reference value as represented in Equation 6. Here, the longitudinal acceleration map is a data map containing the drive shaft driving torque values and the longitudinal acceleration values corresponding to the drive shaft driving torque values when the drive shaft driving torque values are fully used while driving the vehicle.

|Longitudinal acceleration value−General longitudinal acceleration value|≤Second reference value    Equation 6

If the absolute value of Equation 6 is smaller than or equal to the second reference value, it is determined that a slip does not occur in the vehicle, and if the absolute value of Equation 6 is larger than the second reference value, it is determined that a slip occurs in the vehicle. In other words, if the absolute value of Equation 6 is larger than the second reference value, it means that the drive shaft driving torque value is not fully used in the driving of the vehicle by a slip that occurs in one or more of the front wheels and rear wheels of the vehicle, and if the absolute value of Equation 6 is smaller than or equal to the second reference value, it means that the drive shaft driving torque value is fully used in the driving of the vehicle because a slip does not occur in one or more of the front wheels and rear wheels of the vehicle.

If the slip determination unit 120 determines that a slip occurs in the vehicle, the torque steer degree calculation unit 130 calculates a slip index, calculates the actual driving torque value of the vehicle using the drive shaft driving torque value and the calculated slip index, and calculates the torque steer degree by using the actual driving torque value. Here, the specific value may be 1, and the range of the slip index that is calculated by the torque steer degree calculation unit 130 may be equal to or larger than 0 and smaller than 1.

A detailed description thereof will be described in the following.

When the slip determination unit 120 determines that a slip occurs in the vehicle through Equation 5, the torque steer degree calculation unit 130 calculates a slip index by dividing the rear wheel rotational speed by a value that is obtained by subtracting the first reference value from the front wheel rotational speed as represented in Equation 7, and calculates an actual driving torque value by multiplying the slip index calculated in Equation 9 and the drive shaft driving torque value.

$$\text{Slip index} = \frac{\text{Rear wheel rotational value}}{\text{Front wheel rotational speed} - \text{First reference value}} \quad \text{Equation 7}$$

When the slip determination unit 120 determines that a slip occurs in the vehicle through Equation 6, the torque steer degree calculation unit calculates a slip index by dividing the longitudinal acceleration value by a value that is obtained by subtracting the second reference value from the general longitudinal acceleration value as represented in Equation 8, and calculates the actual driving torque value by multiplying the slip index calculated in Equation 9 and the drive shaft driving torque value.

$$\text{Slip index} = \frac{\text{Longitudinal acceleration value}}{\text{General longitudinal acceleration value} - \text{Second reference value}} \quad \text{Equation 8}$$

Actual driving torque value=Slip index×Drive shaft driving torque value    Equation 9

Meanwhile, when the slip determination unit 120 determines that a slip does not occur in the vehicle through Equation 5 or 6, the torque steer degree calculation unit 130 calculates the actual driving torque value by multiplying a slip index set to a specific value by the slip determination unit 120 and the drive shaft driving torque value. Here, when the specific value is 1, the drive shaft driving torque value becomes the actual driving torque value.

The torque steering degree calculation unit 130 calculates a torque steer degree by using the actual driving torque value, which is calculated as described above.

Figure 2:
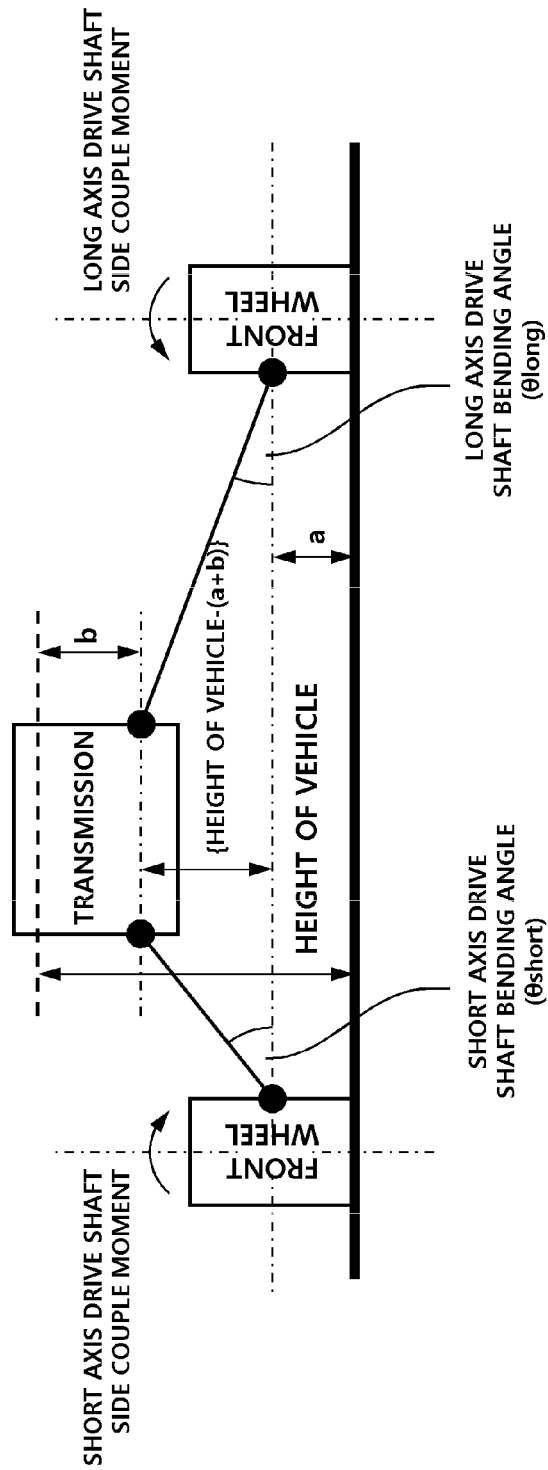
FIG. 2 is a view schematically illustrating a connection structure of a drive shaft in a front wheel drive vehicle.

Here, when a vehicle height sensor (not illustrated) is mounted on the vehicle, the torque steer degree calculation unit 130 calculates a short axis drive shaft bending angle $\theta_{short}$ and a long axis drive shaft bending angle $\theta_{long}$ as represented in FIG. 2 and Equation 10 using the height of the vehicle, the length of a short axis drive shaft and the length of a long axis drive shaft. Here, a denotes the height of a front wheel side connection part of the drive shaft from the ground surface, and b denotes the height of a transmission side connection part of the drive shaft from the bottom surface of the shell of the vehicle.

$$\text{Drive shaft bending angle} = \sin^{-1}\left[\frac{\text{Height of vehicle} - (a+b)}{\text{Length of drive shaft}}\right] \quad \text{Equation 10}$$

The torque steer degree calculation unit 130 calculates a short axis drive shaft side couple moment and a long axis drive shaft side couple moment as represented in Equation 11 by using the calculated drive shaft bending angle, and calculates a torque steer degree by a value that is obtained by subtracting a long axis drive shaft side couple moment $Mz_{long}$ from a short axis drive shaft side couple moment $Mz_{short}$ as represented in Equation 12.

$$\text{Couple moment}(Mz) = \text{Actual driving torque value} \times \left(\tan\frac{\theta}{2}\right) \quad \text{Equation 11}$$

$$\text{Torque steer degree} = Mz_{short} - Mz_{long} \quad \text{Equation 12}$$

Meanwhile, if a vehicle height sensor (not illustrated) is not mounted on the vehicle, the torque steer degree calculation unit 130 extracts a torque steer degree corresponding to the actual driving torque value from a torque steer degree map stored in advance. In other words, a torque steer degree corresponding to the actual driving torque value calculated through Equation 9 is extracted from a torque steer degree data map obtained by measuring the actual driving torque values and a plurality of torque steer degrees corresponding to the actual driving torque values by actual vehicle tests.

The compensation current calculation unit 140 calculates a torque steer compensation current value for compensating for a torque steer using the torque steer degree that is calculated by the torque steer degree calculation unit 130.

In detail, the compensation current calculation unit 140 calculates a torque steer compensation current value by dividing the torque steer degree by a value that is obtained by multiplying a motor torque constant of an electric motor and a gear ratio contained in the transmission operation information as represented in Equation 13.

$$\text{Compensation current} = \frac{\text{Torque steer degree}}{\text{Motor torque constant} \times \text{Gear ratio}} \quad \text{Equation 13}$$

A motor driving control unit 150 calculates a basic control current value using a steering angle and a steering torque value, calculates a final control current value by adding the torque steer compensation current value calculated by the compensation current calculation unit 140 to the basic control current value, and generates a control current according to the final control current value to supply the control current to the electric motor 160.

The electric motor 160 that has received the control current from the motor driving control unit 150 generates an auxiliary steering force for compensating for a torque steer.

In this way, according to the present invention, because the electronic control unit 100 calculates an actual driving torque value that reflects a slip degree that occurs in the wheels of the vehicle and calculates a torque steer compensation current value to compensate for the torque steer using the actual driving torque value, the torque steer that may vary according to a change in the slip degree of the wheels of the vehicle may be appropriately compensated for.

Hereinafter, a process of compensating for a torque steer in the electronic control unit 100 of the motor driven power steering system will be described.

Figure 3:
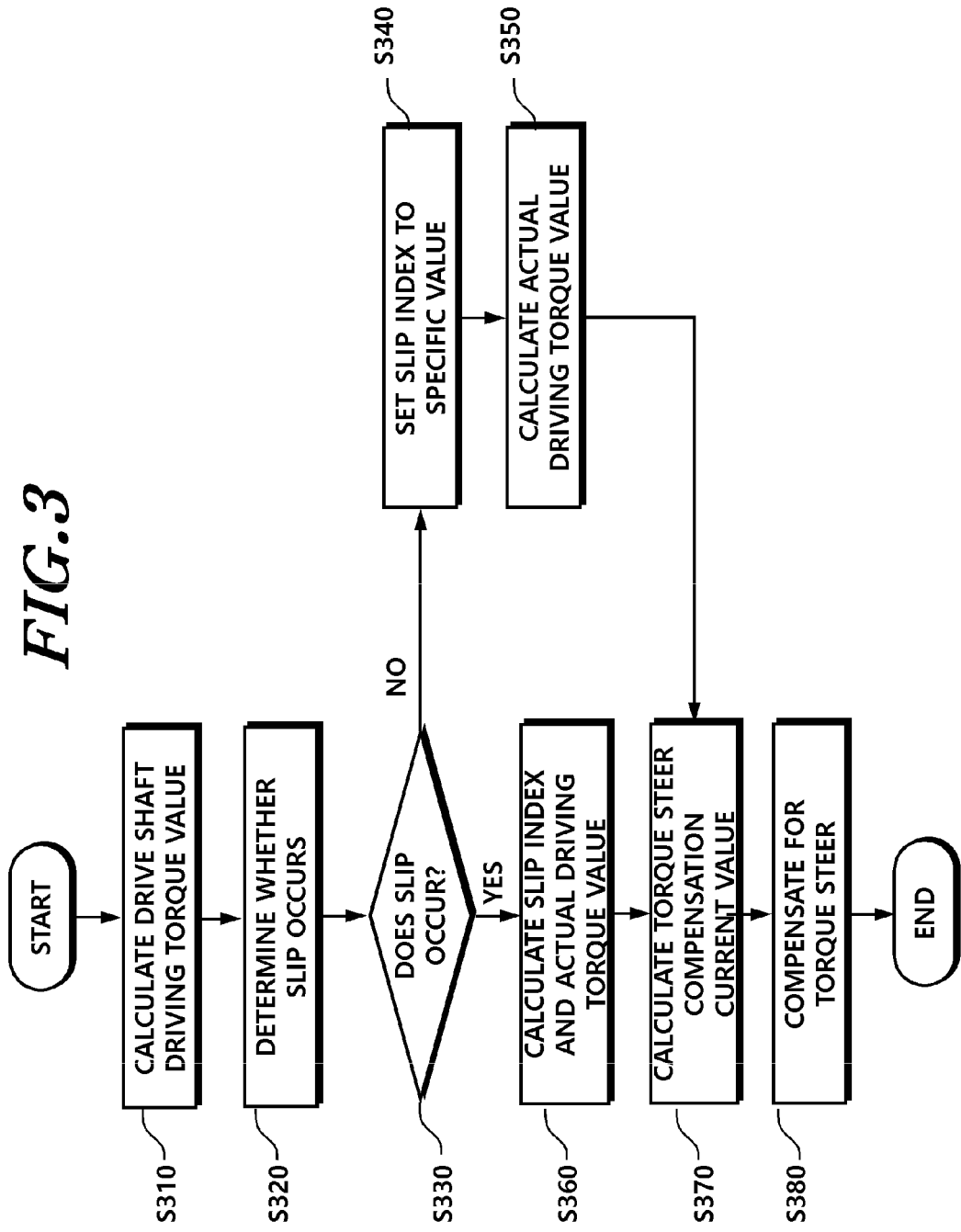
FIG. 3 is a flowchart illustrating an overall process of compensating for a torque steer by the electronic control unit according to the embodiment of the present invention.

FIG. 3 is a flowchart illustrating an overall process of compensating for a torque steer by the electronic control unit 100 according to the embodiment of the present invention.

The electronic control unit 100 calculates a drive shaft driving torque value using engine operation information containing an engine torque value and an engine speed value and transmission operation information containing a torque converter speed value and a gear ratio (S310).

The electronic control unit 100 determines whether a slip of the vehicle occurs using behavior information of the vehicle containing one or more of the front wheel rotational speed, the rear wheel rotational speed, and the longitudinal acceleration value (S320).

If it is determined in step S320 that a slip does not occur in the vehicle, a slip index is set to a specific value, and an actual driving torque value is calculated using the slip index that is set to the specific value and the drive shaft driving torque value (S330, S340, and S350).

If it is determined in step S320 that a slip occurs in the vehicle, a slip index is calculated, and an actual driving torque value of the vehicle is calculated using the calculated slip index and the drive shaft driving torque value (S360).

The electronic control unit 100 calculates a torque steer degree using the actual driving torque value, and calculates a torque steer compensation current value for compensating for a torque steer using the torque steer degree (S370).

Thereafter, the electronic control unit 100 calculates a final control current value by adding the torque steer compensation current value to a basic control current value that is calculated using the steering angle and the steering torque value, and generates a control current according to the final control current value to supply the control current to the electric motor 160 (S380).

Here, a detailed process for steps S310, S320, S360, and S370 is as follows.

Figure 4:
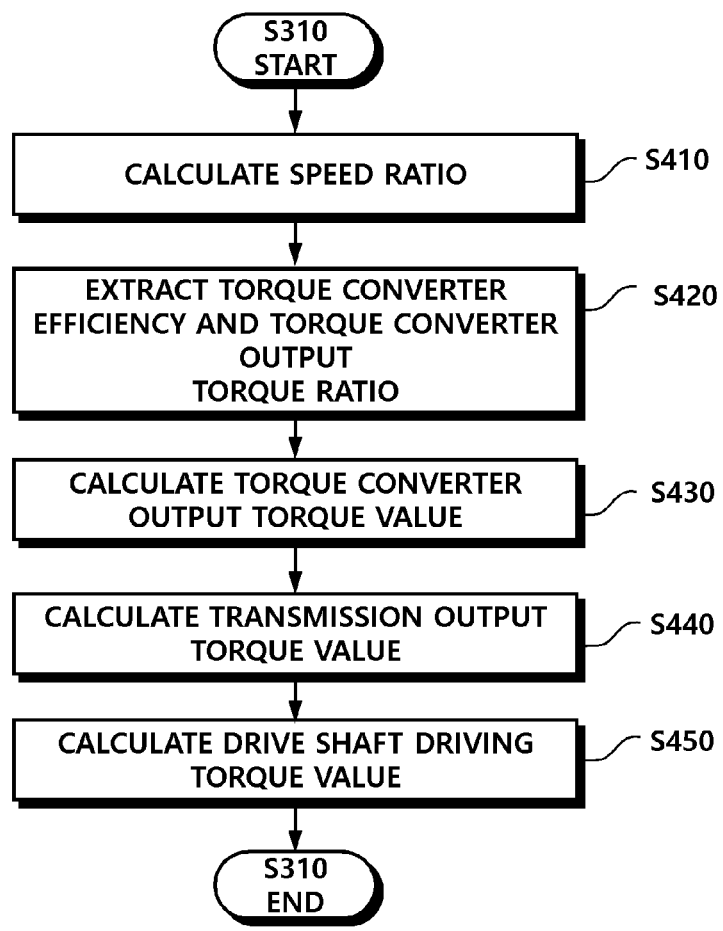
FIG. 4 is a flowchart illustrating a process of calculating a drive shaft driving torque value by the electronic device according to the embodiment of the present invention.

FIG. 4 is a flowchart illustrating a process of calculating a drive shaft driving torque value by the electronic device according to the embodiment of the present invention.

In step S310, the electronic control unit 100 calculates a speed ratio by dividing a torque converter speed value by an engine speed value, and extracts a torque converter efficiency and a torque converter output torque ratio according to the speed ratio (s410 and S420).

Thereafter, the electronic control unit 100 calculates a torque converter output torque value by multiplying all of the torque converter efficiency, the torque converter output torque ratio, and the engine torque value, and calculates a transmission output torque value by multiplying the torque converter output torque value and the gear ratio (S430 and S440).

The electronic control unit 100 calculates a drive shaft driving torque value by multiplying the transmission output torque value calculated in step S440 and a final reduction gear ratio of the final reduction gear (S450).

Figure 5:
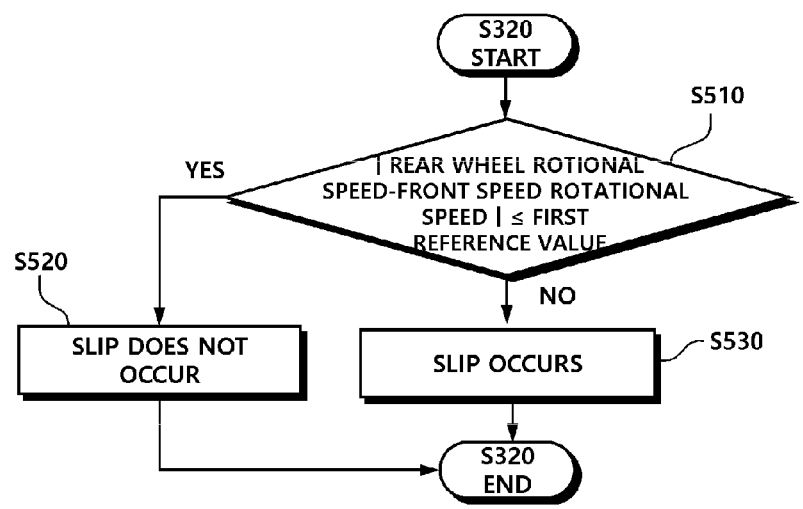
FIGS. 5 and 6 are flowcharts illustrating a process of determining whether a slip occurs by the electronic control unit according to the embodiment of the present invention.
Figure 6:
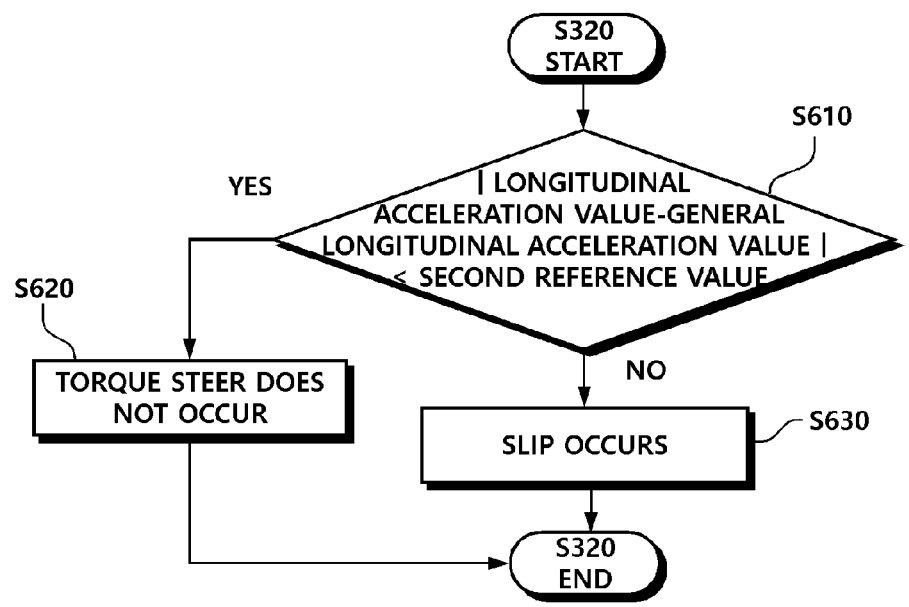

FIGS. 5 and 6 are flowcharts illustrating a process of determining whether a slip occurs by the electronic control unit according to the embodiment of the present invention.

If an electronic stability control unit 100 is not mounted on the vehicle, the electronic control unit 100 compares the absolute value of a value that is obtained by subtracting the front wheel rotational speed from the rear wheel rotational speed as illustrated in FIG. 5 in step S320 with the first reference value (S510).

If the absolute value is smaller than or equal to the first reference value in step S510, it is determined that a slip does not occur in the vehicle, and if the absolute value is larger than the first reference value in step S510, it is determined that a slip occurs in the vehicle (S520 and S530).

Meanwhile, If an electronic stability control unit is mounted on the vehicle, the electronic control unit 100 extracts a general longitudinal acceleration value according to the drive shaft driving torque value from the longitudinal acceleration map stored in advance in step S320 as illustrated in FIG. 6, and compares the absolute value of a value that is obtained by subtracting the general longitudinal acceleration value from the longitudinal acceleration value with the second reference value (S610).

If the absolute value is smaller than or equal to the second reference value in step S610, it is determined that a slip does not occur in the vehicle, and if the absolute value is larger than the second reference value in step S610, it is determined that a slip occurs in the vehicle (S620 and S630).

Figure 7:
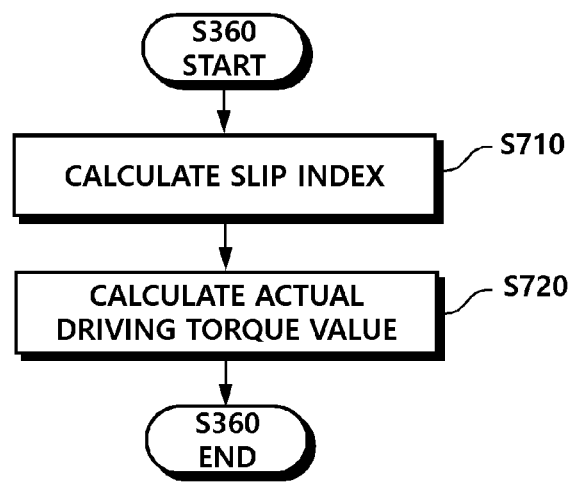
FIG. 7 is a flowchart illustrating a process of calculating an actual driving torque value by the electronic device according to the embodiment of the present invention.

FIG. 7 is a flowchart illustrating a process of calculating a slip index and an actual driving torque value by the electronic device according to the embodiment of the present invention.

If an electronic stability control unit 100 is not mounted on the vehicle in step S360, the electronic control unit 100 divides the rear wheel rotational speed by a value that is obtained by subtracting the first reference value from the front wheel rotational speed to calculate a slip index, and if an electronic stability control unit is mounted on the vehicle, the electronic control unit 100 divides the second reference value from a general longitudinal acceleration value that is extracted according to the drive shaft driving torque value from a longitudinal acceleration map stored in advance to calculate a slip index (S710).

The electronic control unit 100 multiplies the slip index calculated in step S710 and the drive shaft driving torque value to calculate an actual driving torque value (S720).

Figure 8:
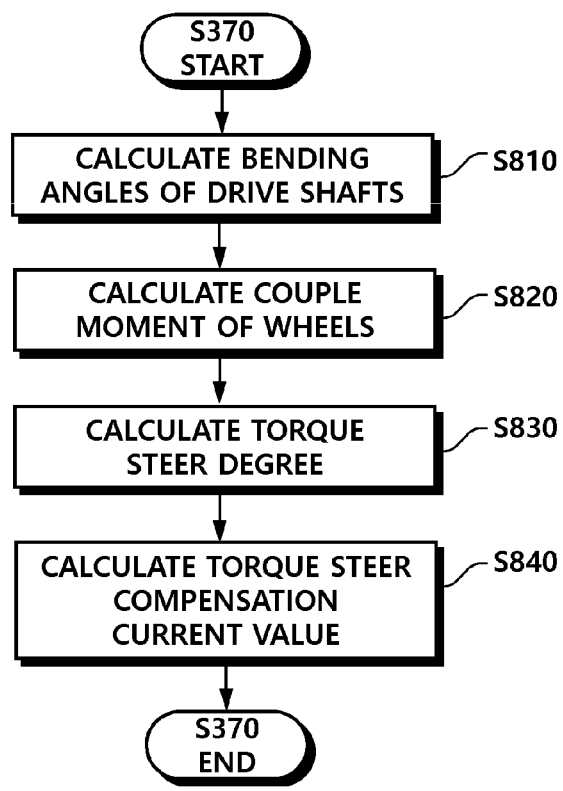
FIGS. 8 and 9 are flowcharts illustrating a process of calculating a torque steer compensating current value by the electronic control unit according to the embodiment of the present invention.
Figure 9:
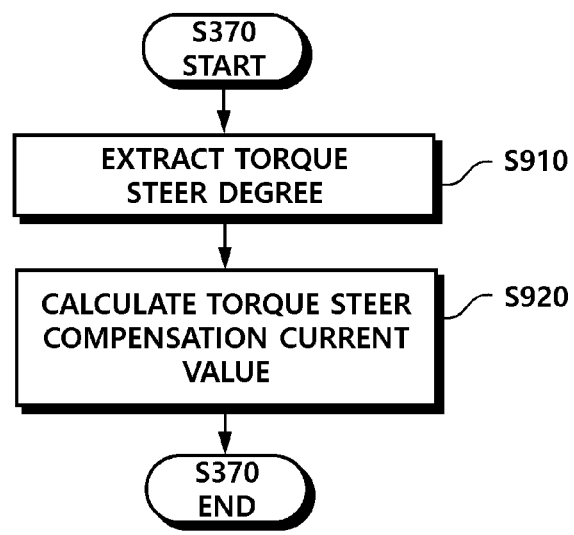

FIGS. 8 and 9 are flowcharts illustrating a process of calculating a torque steer compensating current value by the electronic control unit according to the embodiment of the present invention.

If a vehicle height sensor (not illustrated) is mounted on the vehicle, the electronic control unit 100 calculates a short axis drive shaft bending angle and a long axis drive shaft bending angle using the height of the vehicle, the length of the shaft axis drive shaft, and the length of the long axis drive shaft as illustrated in FIG. 8 (S810).

Thereafter, the electronic control unit 100 calculates a short axis drive shaft side couple moment and a long axis drive shaft side couple moment using the actual driving torque value, the short axis drive shaft bending angle, and the long axis drive shaft bending angle, and calculates a torque steer degree by subtracting the long axis drive shaft side couple moment from the short axis drive shaft side couple moment (S820 and S830).

The electronic control unit 100 divides the torque steer degree that is calculated in step S830 by a value obtained by multiplying the motor torque constant of the electric motor and a gear ratio to calculate the torque steer compensation current value (S840).

Meanwhile, if a vehicle height sensor (not illustrated) is not mounted on the vehicle, the electronic control unit 100 extracts a torque steer degree corresponding to the actual driving torque value from a torque steer degree map stored in advance, and divides the torque steer degree by a value obtained by multiplying the motor torque constant and the gear ratio in order to calculate the torque steer compensation current value as illustrated in FIG. 9 (S910 and S920).

Even if it was described above that all of the components of an embodiment of the present invention are coupled as a single unit or coupled to be operated as a single unit, the present invention is not necessarily limited to such an embodiment. That is, at least two elements of all structural elements may be selectively joined and operate without departing from the scope of the present invention. Although a preferred embodiment of the present invention has been described for illustrative purposes, those skilled in the art will appreciate that various modifications, additions and substitutions are possible, without departing from the scope and spirit of the invention as disclosed in the accompanying claims. The scope of the present invention shall be construed on the basis of the accompanying claims in such a manner that all of the technical ideas included within the scope equivalent to the claims belong to the present invention.

What is claimed is:

1. An electronic control unit for compensating for a torque steer, the electronic control unit comprising:
   a driving torque calculation unit that calculates a drive shaft driving torque value using engine operation information and transmission operation information;
   a torque steer degree calculation unit that calculates the actual driving torque value of a vehicle based on the drive shaft driving torque value, and calculates a torque steer degree by using the actual driving torque value;
   a compensation current calculation unit that calculates a torque steer compensation current value that compensates for the torque steer using the torque steer degree; and
   a motor driving control unit that calculates a basic control current value using a steering angle and a steering torque value, calculates the final control current value by adding the torque steer compensation current value to the basic control current value, and generates a control current according to the final control current value in order to supply the control current value to an electric motor.

2. The electronic control unit of claim 1, wherein the engine operation information contains an engine torque value and an engine speed value, and the transmission operation information contains a torque converter speed value and a gear ratio.

3. The electronic control unit of claim 1, further comprising:
   a slip determination unit that determines whether a slip of the vehicle occurs using behavior information of the vehicle that contains a front wheel rotational speed and a rear wheel rotational speed.

4. The electronic control unit of claim 3, wherein the slip determination unit determines that a slip does not occur in the vehicle if the absolute value of a value obtained by subtracting the front wheel rotational speed from the rear wheel rotational speed is smaller than or equal to a first reference value, and determines that a slip occurs in the vehicle if the absolute value is larger than the first reference value.

5. The electronic control unit of claim 3, wherein the torque steer degree calculation unit calculates a slip index and calculates the actual driving torque value of the vehicle using the slip index and the drive shaft driving torque value if it is determined that a slip occurs in the vehicle.

6. The electronic control unit of claim 5, wherein the torque steer degree calculation unit calculates the slip index by dividing the rear wheel rotational speed by a value that is obtained by subtracting a first reference value from the front wheel rotational speed, and calculates the actual driving torque value by multiplying the slip index and the drive shaft driving torque value.

7. The electronic control unit of claim 3, wherein the behavior information contains a longitudinal acceleration value of the vehicle, and the slip determination unit extracts a general longitudinal acceleration value according to the drive shaft driving torque value from a longitudinal acceleration map that is stored in advance, determines that a slip does not occur in the vehicle if the absolute value of a value obtained by subtracting the general longitudinal acceleration value from the longitudinal acceleration value is smaller than or equal to a second reference value, and determines that a slip occurs in the vehicle if the absolute value is larger than the second reference value.

8. The electronic control unit of claim 7, wherein the torque steer degree calculation unit calculates the slip index by dividing the longitudinal acceleration value by a value that is obtained by subtracting the second reference value from the general longitudinal acceleration value, and calculates the actual driving torque value by multiplying the slip index and the drive shaft driving torque value.

9. The electronic control unit of claim 1, wherein the torque steer degree calculation unit calculates the torque steer degree based on a short axis drive shaft bending angle and a long axis drive shaft bending angle that are calculated using the height value of the vehicle, the length of a short axis drive shaft, and the length of a long axis drive shaft.

10. The electronic control unit of claim 1, wherein the compensation current calculation unit calculates the torque steer compensation current value by dividing the torque steer degree by a value that is obtained by multiplying a motor torque constant of the electric motor and a gear ratio contained in the transmission operation information.

11. A method for compensating a torque steer in an electronic control unit of a motor driven power steering system, the method comprising:
- a drive shaft driving torque calculating step of calculating a drive shaft driving torque value using engine operation information that contains an engine torque value and an engine speed value and transmission operation information containing a torque converter speed value and a gear ratio;
- a slip determining step of determining whether a slip of a vehicle occurs using behavior information of the vehicle containing one or more of a front wheel rotational speed, a rear wheel rotational speed, and a longitudinal acceleration value;
- an actual driving torque value calculating step of, if it is determined in the slip determining step that a slip does not occur in the vehicle, setting a slip index to a specific value, and if it is determined in the slip determining step that a slip occurs in the vehicle, calculating the slip index and calculating an actual driving torque value of the vehicle using the drive shaft driving torque value and the slip index;
- a compensating current calculating step of calculating a torque steer degree using the actual driving torque value, and calculating a torque steer compensation current value for compensating the torque steer using the torque steer degree; and
- a torque steer compensating step of calculating a final control current value by adding the torque steer compensation current value to a basic control current value that is calculated using a steering angle and a steering torque value, and generating a current value according to the final control current value to supply the control current to an electric motor.

12. The method of claim 11, wherein the compensation current calculating step comprises:
- a step of calculating a short axis drive shaft bending angle and a long axis drive shaft bending angle using the height value of the vehicle, the length of a short axis drive shaft, and the length of a long axis drive shaft;
- a step of calculating a short axis drive shaft side couple moment and a long axis drive shaft side couple moment using the actual driving torque value, the short axis drive shaft bending angle, and the long axis drive shaft bending angle;
- a step of calculating the torque steer degree by subtracting the long axis drive shaft side couple moment from the short axis drive shaft side couple moment; and
- a step of calculating the torque steer compensation current value by dividing the torque steer degree by a value obtained by multiplying the motor torque constant of an electric motor and the gear ratio.

13. The method of claim 11, wherein the compensation current calculating step comprises:
- a step of extracting the torque steer degree corresponding to the actual driving torque value from a torque steer degree map stored in advance; and
- a step of calculating the torque steer compensation current value by dividing the torque steer degree by a value that is obtained by multiplying a motor torque constant of an electric motor and the gear ratio.

* * * * *